United States Patent
Aso et al.

(10) Patent No.: US 6,704,252 B2
(45) Date of Patent: Mar. 9, 2004

(54) METHOD AND APPARATUS FOR REPRODUCING INFORMATION DATA FROM PARTIAL CD-R

(75) Inventors: Yoshihiro Aso, Saitama-ken (JP); Akihito Kajita, Saitama-ken (JP); Takao Uchikura, Saitama-ken (JP); Masaaki Matsumoto, Saitama-ken (JP)

(73) Assignee: Pioneer Corporation, Tokyo (JP)

(*) Notice: Subject to any disclaimer, the term of this patent is extended or adjusted under 35 U.S.C. 154(b) by 237 days.

(21) Appl. No.: 09/790,503

(22) Filed: Feb. 23, 2001

(65) Prior Publication Data

US 2001/0017822 A1 Aug. 30, 2001

(30) Foreign Application Priority Data

Feb. 24, 2000 (JP) .......................... 2000-047844

(51) Int. Cl.[7] .......................... G11B 21/08; G11B 20/18
(52) U.S. Cl. .................. 369/30.11; 369/53.24
(58) Field of Search .................. 369/30.11, 30.04, 369/47.21, 47.22, 47.55, 53.21, 53.41, 53.45, 53.24

(56) References Cited

U.S. PATENT DOCUMENTS

| | | | |
|---|---|---|---|
| 4,707,815 A | | 11/1987 | Yamasaki .................. 369/33 |
| 5,381,392 A | * | 1/1995 | Hira .................. 369/54 |
| 5,394,383 A | * | 2/1995 | Hira .................. 369/32 |
| 5,471,441 A | * | 11/1995 | Nonaka et al. .................. 369/32 |
| 5,559,778 A | * | 9/1996 | Inokuchi et al. .................. 369/58 |
| 5,706,261 A | | 1/1998 | Udagawa .................. 369/32 |
| 5,896,351 A | * | 4/1999 | Misaizu et al. .................. 369/32 |
| 6,151,281 A | * | 11/2000 | Van Der Enden et al. .... 369/47 |
| 6,266,308 B1 | * | 7/2001 | Andoh .................. 369/53.24 |

FOREIGN PATENT DOCUMENTS

| | | |
|---|---|---|
| EP | 0 480 761 A2 | 4/1992 |
| EP | 0 837 473 A2 | 4/1998 |

* cited by examiner

*Primary Examiner*—Tan Dinh
(74) *Attorney, Agent, or Firm*—Arent Fox Kintner Plotkin & Kahn

(57) ABSTRACT

A pickup is moved in the radial direction of a partial CD-R, and the end position of a recorded area in the partial CD-R is detected based on a feature signal (on track signal) in the radial direction obtained during the movement. Information recorded in the recorded area is reproduced based on the detected end position, so that an accessing inability can be avoided, and the information in the recorded area can correctly be reproduced. Thus, information recorded in the partial CD-R can correctly be reproduced.

12 Claims, 10 Drawing Sheets

INNER CIRCUMFERENTIAL SIDE ◄──── RADIAL DIRECTION ────► OUTER CIRCUMFERENTIAL SIDE
FIG.3 A  S<sub>RF</sub>
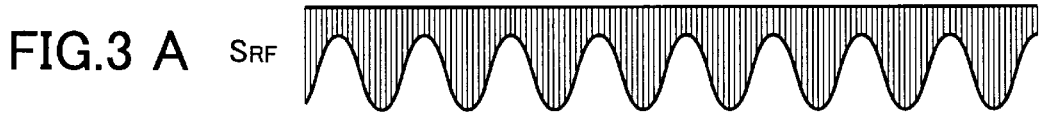
FIG.3 B  S<sub>RF'</sub>
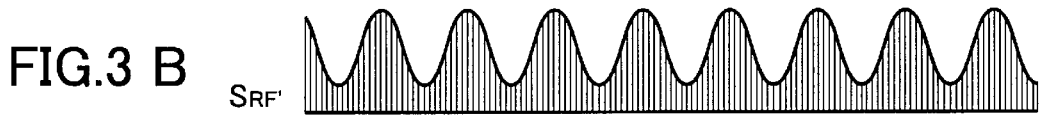
FIG.3 C  S<sub>P</sub>
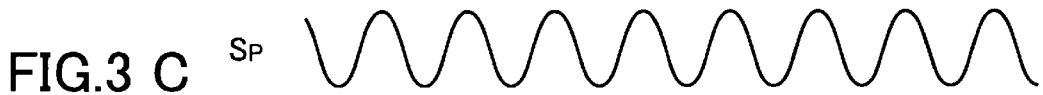
FIG.3 D  S<sub>B</sub>
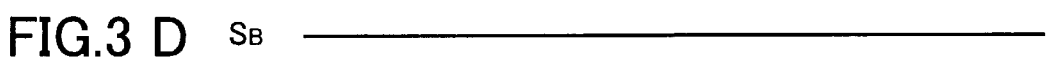
FIG.3 E  S<sub>PB'</sub> S<sub>MH</sub>
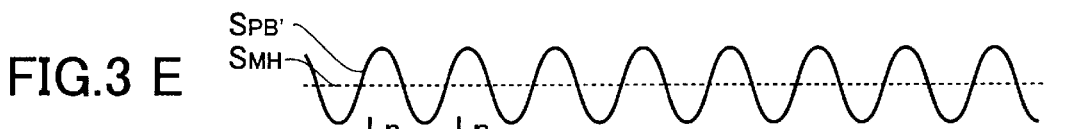
Ln  Ln
FIG.3 F  S<sub>OT</sub>
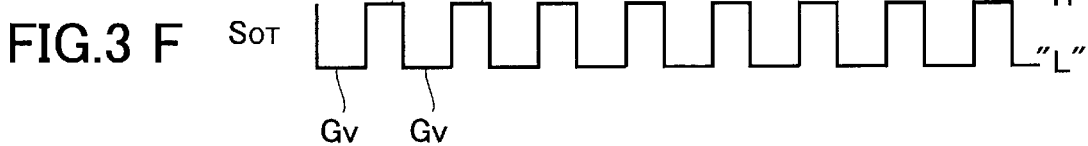
Gv  Gv

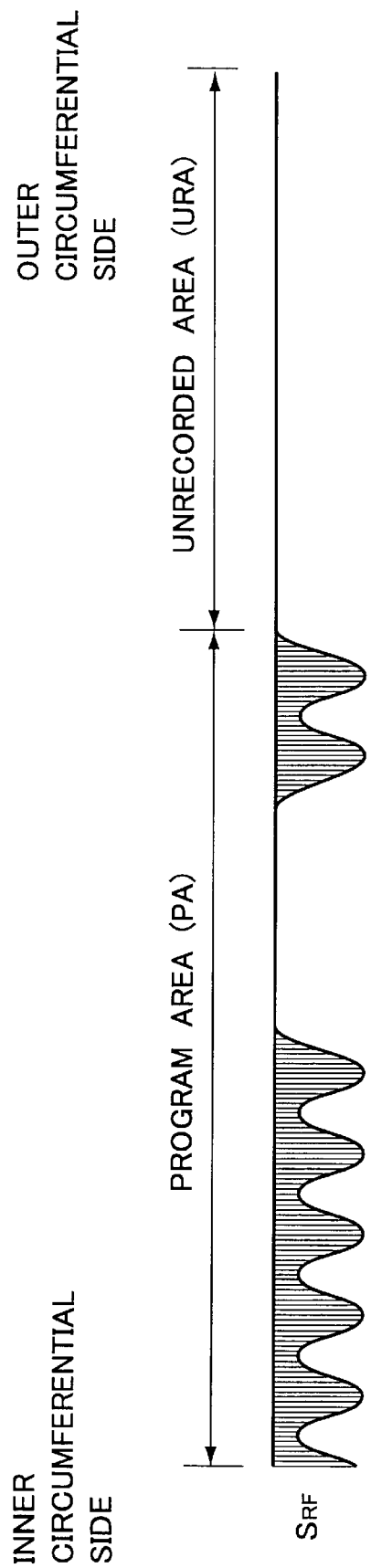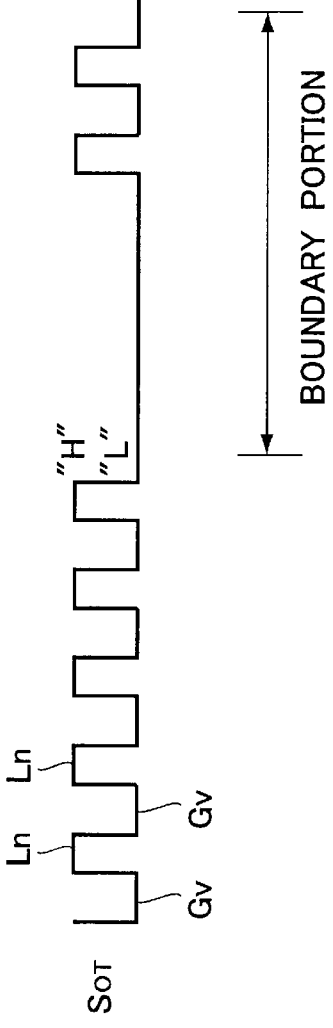
FIG.9 A
FIG.9 B (DATA STRUCTURE OF CD-ROM)

(DATA STRUCTURE OF UNRECORDED CD-R)

(DATA STRUCTURE OF PARTIAL CD-R)

(DATA STRUCTURE OF FINALIZED CD-R)

METHOD AND APPARATUS FOR REPRODUCING INFORMATION DATA FROM PARTIAL CD-R

BACKGROUND OF THE INVENTION

The present invention relates to information reproducing apparatuses such as a CD (Compact Disc) player, and more specifically, to an information reproducing apparatus capable of reproducing information recorded in different kinds of information storage media in a compatible manner, and an information reproducing method therefor.

The CD for reproduction only (hereinafter as "CD-ROM") was developed as an information recording medium capable of recording a large amount of information in a high density. More recently, the CD to which information can be additionally recorded (hereinafter as "CD-R") was developed.

The CD-ROM is an information recording medium only for reproduction (read only), while the CD-R can be recorded with additional information though already recorded information cannot be deleted therefrom. The CD-R therefore provides diversity as an information recording medium.

The CD-R was developed as an information recording medium compatible with the CD-ROM. An information reproducing apparatus adapted only for the CD-ROM specification can also reproduce information recorded in the CD-R.

FIG. 10 shows the data structure of a CD-ROM, while FIGS. 11 to 13 show the data structure of a CD-R.

In FIG. 10, the CD-ROM includes a lead in area LIA, a program area PA, and a lead out area LOA from the inner circumferential side to the outer circumferential side. The program area PA is a recorded area which is recorded with contents information such as music information. The lead out area LOA is recorded with information indicating an end position of the program area PA.

These lead in area LIA, program area PA, and lead out area LOA are generically referred to as information area, and recorded with information after EFM modulation (Eight to Fourteen Modulation).

The lead in area LIA is recorded with index information called TOC (Table of Contents), i.e., index information such as the total number of music recorded in the program area PA, the total recording time, the recording start position (recording start address), and the recording end position (recording end address).

The program area PA is recorded with the contents information on a frame-basis, and each frame is attached with information called sub coding.

More specifically, one set of sub coding information for 98 frames is specified to have one meaning. When reproducing time per frame is τ, one set of sub coding information can be read out for each time period of 98×τ.

The sub coding information includes information for eight channels P, Q, R, S, T, U, V and W. The channel P represents a silent part inserted between music in for example music information. The six channels R, S, T, U, V and W are used to record information on characters used for a karaoke (sing-along system) display.

The channel Q is for recording information such as movement numbers in the music information as described above, index numbers in a movement, the passed time in a movement at a frame position in a music and absolute time.

The information reproducing apparatus reproduces the Q channel information, so that the track numbers, the passed time in the music being presently reproduced or absolute time can be displayed in real time.

In FIG. 11, if the CD-R has never been recorded with contents information, there is no information recorded in areas corresponding to the lead in area LIA, the program area PA and the lead out area LOA, in other words, a so-called unrecorded area URA is formed. The CD-R is typically provided with a power calibration area PCA on the inner circumferential side for test writing at the time of recording information. The power calibration area PCA is also entirely new in this case.

A CD-R after at least one information recording and still having an unrecorded area URA is called partially recorded disc (partial disc). The data structure of such a partial disc is shown in FIG. 12.

More specifically, music information or the like is recorded to the disc to form a program area PA and a program memory area PMA. The program area PA is formed by recording the music information or the like in a part of the unrecorded area URA. The program memory area PMA is formed by recording information related to the history of the music information or the like recorded in the program area PA.

The information related to the history is called "temporary TOC" and includes information on the recording start position (recording start address) and the recording end position (recording end address) of information recorded in the program area PA.

When an information reproducing apparatus adapted for the CD-R specification reproduces information from this partial disc (hereinafter as "partial CD-R"), the apparatus can read the temporary TOC information and access music information or the like recorded in the program memory area PMA for reproduction based on the read temporary TOC information. When information is additionally recorded in the unrecorded area URA of the partial CD-R, access is controlled based on the temporary TOC information, so that the information can be additionally recorded from the start position of the unrecorded area URA.

Note however that the information reproducing apparatus adapted for the CD specification accesses information recorded in the program area PA based on the TOC information in the lead in area LIA as shown in FIG. 10. Therefore, the apparatus is not adapted to read the temporary TOC information. More specifically, the pickup cannot move to the PMA area. As a result, information recorded in the program area PA in the partial CD-R cannot correctly be accessed for reproduction.

FIG. 13 shows the structure of data in a partial CD-R after finalization processing, i.e., the data structure in a partial CD-R finalized such that the information reproducing apparatus adapted for the CD-ROM specification can correctly reproduce information.

When the information reproducing apparatus adapted for the CD-R specification performs the finalization processing as described above, TOC information is produced based on the temporary TOC information recorded in the program memory area PMA in the partial CD-R. Then, the TOC information is recorded in an empty area URLIA (see FIG. 12) between the program memory area PMA and the program area PA, so that a lead in area LIA identical to that in the CD-ROM can be formed. Also, information indicating the end position of the program area PA is recorded in an unrecorded area at the rear of the program area PA, so that a lead out area LOA can be formed.

As described above, the TOC information and the like adapted for the CD-ROM specification can be recorded in the lead in area LIA and lead out area LOA by the finalization processing. As a result, the information reproducing apparatus adapted only for the CD-ROM specification can reproduce information from a CD-R similarly to a CD-ROM.

As described above, the conventional information reproducing apparatus adapted only for the CD-ROM specification cannot read the temporary TOC information, and therefore information cannot correctly be reproduced from the partial CD-R.

The parietal CD-R however advantageously permits information to be additionally recorded in an unrecorded area until the disc is finalized. Therefore, there has been an increasing demand for an information reproducing apparatus adapted only for the CD-ROM specification and yet capable of reproducing information from the partial CD-R correctly.

The conventional information reproducing apparatus adapted only for the CD-ROM specification cannot correctly reproduce information from a partial CD-R for the following reasons.

In the conventional information reproducing apparatus adapted to reproduce only from the CD-ROM, the pickup cannot physically move to the PMA area present more on the inner circumferential side than the LIA area. Therefore, the apparatus cannot read "temporary TOC," and information such as the total number of music, the total recording time and the recording end position cannot be detected.

The conventional information reproducing apparatus can only cope with the spindle servo method according to which the linear velocity is constant based on the velocity information extracted from an EFM modulated signal in read information. Therefore, only the recorded part can normally be reproduced. If the pickup is moved to an unrecorded part for reproduction, the rotation could be out of control. In such a case, the pickup must be moved to a recorded part so that the rotation may be controlled stably.

For these restrictions associated with reproduction of the partial CD-R using the conventional information reproducing apparatus, convenient functions enabled using the disc such as track search, program reproduction and random reproduction can hardly be achieved.

The track search is a function to select and reproduce a desired music from the total number of music. The program reproduction is a function to program desired music selected from the total number of music in a sequence for reproduction. The random reproduction is a function to randomly select music from the total number of music on the reproducing apparatus side for reproduction.

In a track search operation, if the total number of music and the recording end address are not available, the pickup must always be moved little by little for fear that the pickup enters an unrecorded area, which increases time for accessing. The program reproduction or random reproduction operation can hardly be achieved if the total number of music is not known.

Note that the following method might be employed in order to avoid these problems. All the information from the recording start position to the recording end position of the program area PA is reproduced. Then, in initialization, the physical position where the RF signal ceases to be obtained is determined as the start position (absolute address) of the unrecorded area URA. After the initialization, access is controlled so as not to go beyond the determined absolute address.

This method however necessitates all the recording tracks having pits to be line-scanned and the initialization takes too long. Therefore, the method is disadvantageously inconvenient for the user.

If the initialization is performed by line-scanning, a damage encountered in the process could cause a track jump to the inner circumference; in other words, the operation might come into a loop state and never end in some cases.

SUMMARY OF THE INVENTION

The present invention is directed to a solution to these disadvantages associated with the conventional technique, and it is an object of the present invention to provide an information reproducing apparatus capable of reproducing information recorded in different types of information recording media in a compatible manner, and an information reproducing method therefor.

More specifically, it is an object of the present invention to provide an information reproducing apparatus capable of quickly detecting the recording end position of a program area in a partial CD-R and an information reproducing method therefor.

In order to achieve the above objects, an information reproducing apparatus according to present invention has a pickup for detecting physical information on opposing positions in a disc-shaped information recording medium including a recorded area having a recording track recorded with information and an unrecorded area with no information record to output a detection signal, and generation means for generating the information recorded in the recorded area based on the detection signal. The recorded area and unrecorded area are present in series. The apparatus includes moving means for advancing/withdrawing the pickup in the radial direction of the information recording medium, signal generation means for generating a feature signal including physical feature information on the information recording medium in the radial direction based on the detection signal output from the pickup during the radial movement, determination means for determining which area the pickup has detected physical information on, the recorded area or the unrecorded area, based on a change in the feature signal, and control means for controlling each operation of the moving means, the signal generation means and the determination means while determining an end position of the recorded area based on a determination result by the determination means.

An information reproducing method in an information reproducing apparatus having a pickup for detecting physical information on opposing positions in a disc-shaped information recording medium including a recorded area having a recording track recorded with information and an unrecorded area with no information recorded to output a detection signal, and generation means for generating the information recorded in the recorded area based on the detection signal. The recorded area and the unrecorded area are present in series. The method includes a first step of advancing/withdrawing the pickup in the radial direction of the information recording medium, a second step of generating a feature signal including physical feature information on the information recording medium in the radial direction based on the detection signal output from the pickup during the radial movement, a third step of determining which area the pickup detects physical information on, the recorded area or the unrecorded area, based on a change in the feature signal, and a fourth step of determining the end position of the recorded area based on the determination result.

According to the information reproducing apparatus and the information reproducing method in the information reproducing apparatus, the pickup is moved in the radial direction of an information recording medium, and the end position of the recorded area in the information recording medium is detected based on a feature signal in the radial direction obtained during the movement. Thus, the end position of the recorded area can be detected faster than the method of line-scanning all the information in the recorded area. The accessing inability encountered by the conventional techniques can be avoided and information can correctly be reproduced from the recorded area.

BRIEF DESCRIPTION OF THE DRAWINGS

These and other objects and advantages of the present invention will become clear from the following description with reference to the accompanying drawings, wherein:

FIGS. 3A to 3F are waveform charts for use in illustration of the operation of the on track signal generation circuit;

FIGS. 9A and 9B are waveform charts showing the waveforms of an RF signal and an on track signal generated in the boundary between the program area and the unrecorded area in initialization processing by way of illustration;

DETAILED DESCRIPTION OF THE PREFERRED EMBODIMENTS

Figure 1:
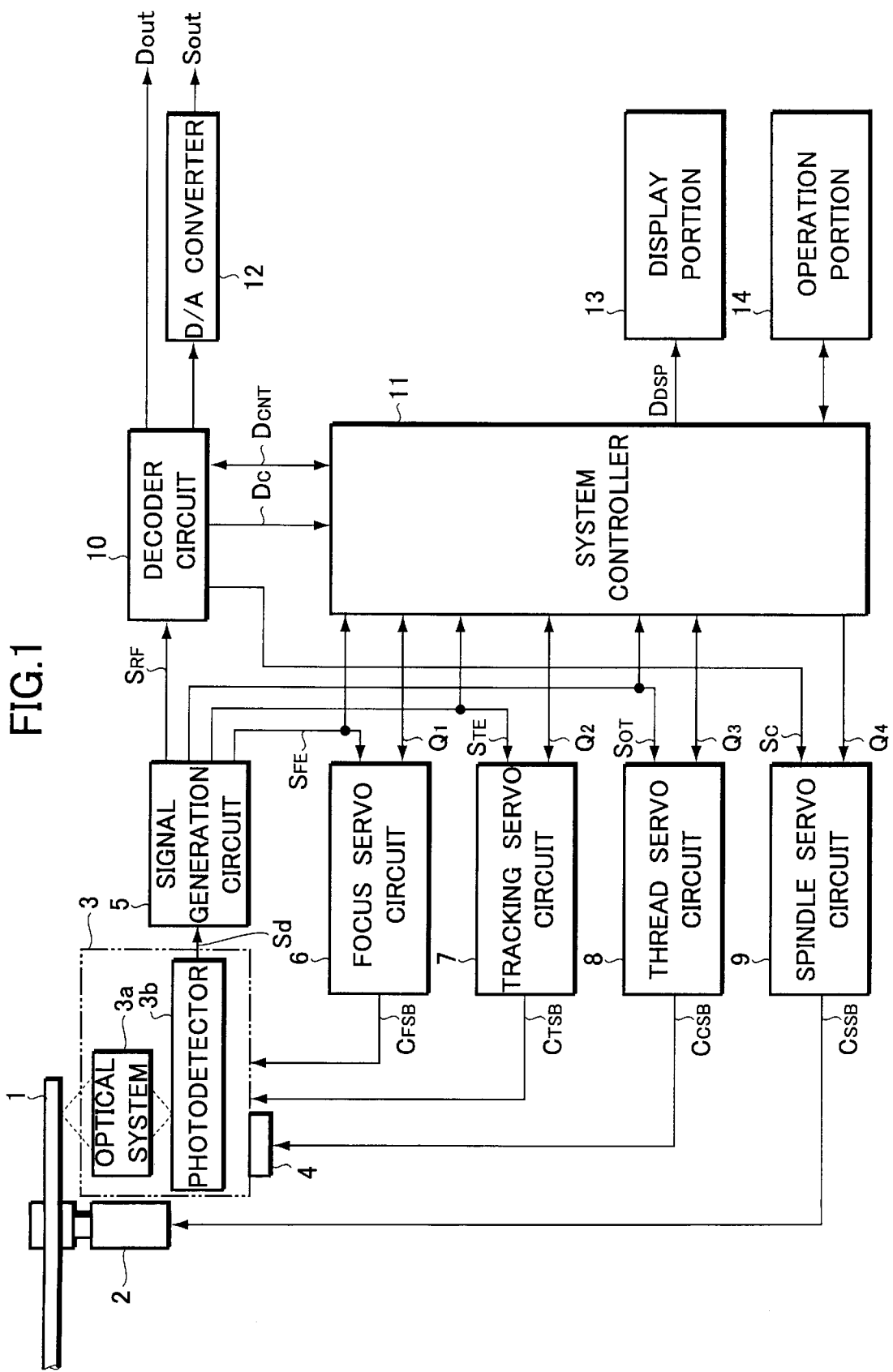
FIG. 1 is a block diagram of the configuration of an information reproducing apparatus (CD player) according to an embodiment of the present invention.

An embodiment of the present invention will be now described in conjunction with the accompanying drawings. FIG. 1 is a block diagram of the configuration of a CD player as an information reproducing apparatus according to an embodiment of the present invention.

In FIG. 1, the CD player includes a spindle motor 2, a pickup 3, and a carriage 4. The spindle motor 2 drives a compact disc (CD) 1 to rotate, and the carriage 4 advances/withdraws the pickup 3 in the radial direction of the compact disc 1.

Herein, the spindle motor 2 rotates in response to a spindle servo control signal CSB from a spindle servo circuit 9 which will be described later, and drives the compact disc 1 to rotate at a constant linear velocity.

The pickup 3 includes an optical system 3a and a photodetector 3b. The compact disc 1 is irradiated with a laser beam from the optical system 3a, light reflected therefrom is detected by the photodetector 3b, and a detection signal Sd therefrom is output to a signal generation circuit 5 which will be described later. More specifically, the photodetector 3b photoelectrically converts the received reflected light and outputs the detection signal Sd having physical information necessary for generating the RF signal $S_{RF}$, a focus error signal $S_{FE}$, a tracking error signal $S_{TE}$, and an on track signal $S_{OT}$. These signals will be later described. Note that an astigmatism method or a Foucault method is employed to obtain information necessary for generating the focus error signal $S_{FE}$, while a three-beam method or a push-pull method is employed to obtain information necessary for generating the tracking error signal $S_{TE}$. These methods are known from various documents and therefore will not be detailed here.

The pickup 3 is provided with an actuator (not shown) to subtly adjust the distance between an objective lens (not shown) provided at the optical system 3a and the compact disc 1. The actuator is controlled in response to a focus servo control signal $C_{FSB}$ from a focus servo circuit 6 which will be described later, so that the focal position of a laser beam emitted from the objective lens to the compact disc 1 is subtly adjusted.

The pickup 3 is provided with another actuator to subtly adjust the direction of the optical axis of the objective lens to the compact disc 1. The actuator is controlled in response to a tracking servo control signal $C_{TSB}$ from a tracking servo circuit 7 which will be described later, so that a laser beam is accurately positioned on a recording track formed on the compact disc 1.

The carriage 4 advances/withdraws in the radial direction of the compact disc 1 by the driving force of a thread motor (not shown) controlled in response to a thread servo control signal $C_{SSB}$ from a thread servo circuit 8 which will be described later.

In addition to the signal generation circuit 5, the focus servo circuit 6, the tracking servo circuit 7, the thread servo circuit 8, and the spindle servo circuit 9 described above, the CD player further includes a decoder circuit 10, a system controller 11, a D/A converter 12, a display portion 13, and an operation portion 14.

The signal generation circuit 5 processes the detection signal Sd output from the photodetector 3b to generate and output the RF signal $S_{RF}$, the focus error signal $S_{FE}$, the tracking error signal $S_{TE}$ and the on track signal $S_{OT}$. Not that the focus error signal $S_{FE}$ and the tracking error signal $S_{TE}$ are generated by the astigmatism method, the Foucault method, the three-beam method or the push-pull method described above, and therefore the generation method will not be detailed. The RF signal $S_{RF}$ is also generated by a well-known method which will not be detailed.

Figure 2:
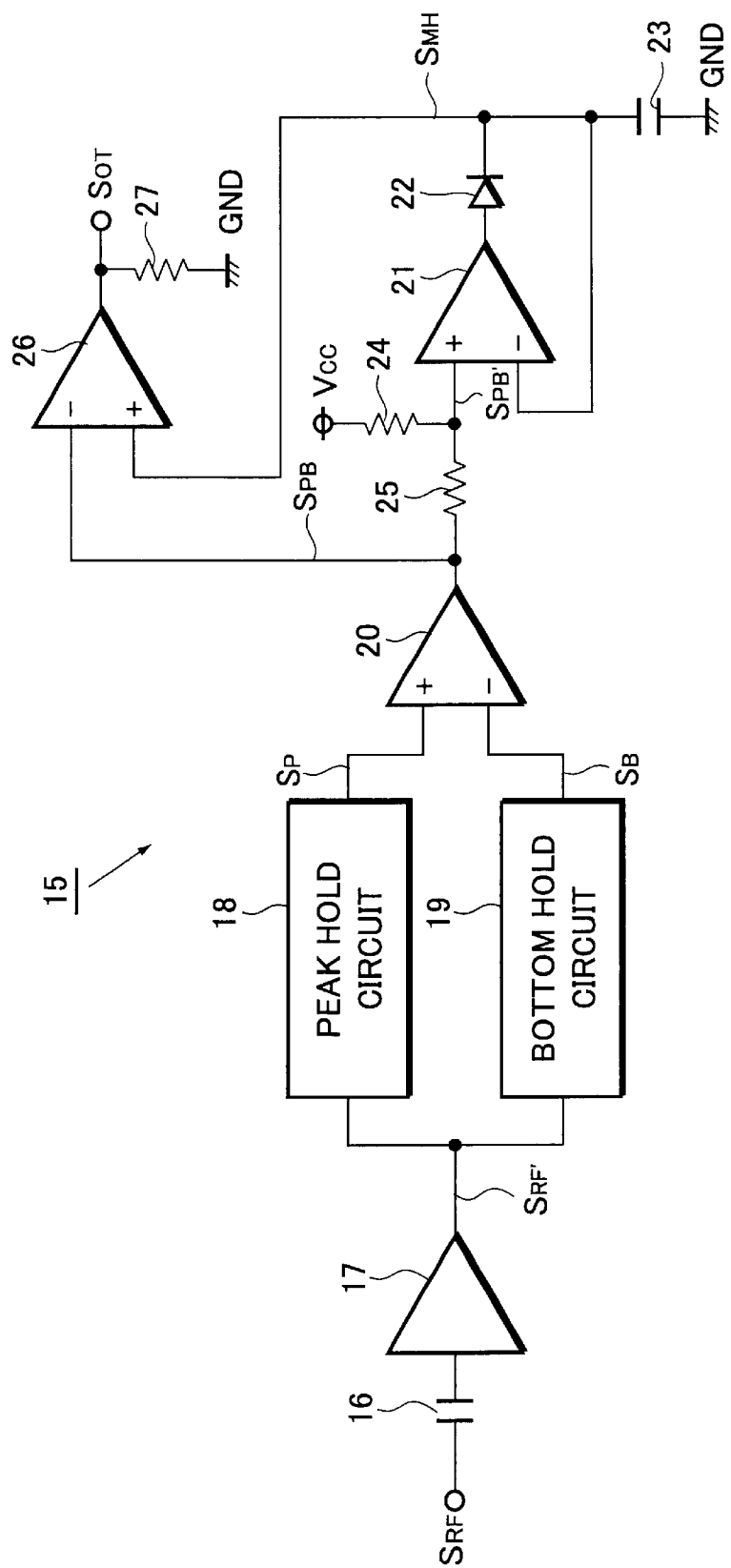
FIG. 2 is a circuit diagram of the configuration of an on track signal generation circuit.

The on track signal $S_{OT}$ is generated by an on track signal generation circuit 15 shown in FIG. 2. The on track signal generation circuit 15 is provided in the signal generation circuit 5, and includes a coupling capacitor 16, an inverting amplifier 17, a peak hold circuit 18, a bottom hold circuit 19, differential amplifiers 20, 21, a diode 22, a hold capacitor 23, resistors 24, 25, 27, and a comparator 26.

Furthermore, when the carriage 4 moves in the radial direction of the compact disc 1, and a laser beam emitted from the optical system 3a in the pickup 3 moves over a recording track on the compact disc 1 in the radial direction, the RF signal $S_{RF}$ results from light reflected therefrom. The on track signal generation circuit 15 generates the on track signal $S_{OT}$ having feature information on each part of the compact disc 1 in the radial direction based on the RF signal $S_{RF}$ thus obtained.

The inverting amplifier 17 inverts and amplifies the RF signal $S_{RF}$ supplied through the coupling capacitor 16, so as to generate an RF signal $S_{RF}'$ having a phase inverted from that of the RF signal $S_{RF}$. More specifically, when the pickup 3 moves in the radial direction of the compact disc 1, and the RF signal $S_{RF}$ as shown in FIG. 3A is supplied, the RF signal $S_{RF}'$ having an inverted phase as shown in FIG. 3B is generated.

The peak hold circuit 18 holds the amplitude of the RF signal $S_{RF}'$ on the peak side, and generates an envelope signal Sp as shown in FIG. 3C as a result. The bottom hold circuit 19 holds the amplitude of the RF signal $S_{RF}'$ on the bottom side, and generates an envelope signal SB as shown in FIG. 3D as a result.

The differential amplifier 20 differentially operates the envelope signals $S_P$ and $S_B$ to generate a differential signal $S_{PB}$. The differential signal $S_{PB}$ is supplied to the inverting input terminal of the comparator 26. The differential signal $S_{PB}$ is formed into a DC-biased, differential signal $S_{PB}'$ as shown in FIG. 3E by the function of the resistors 24 and 25 supplied with a DC power supply voltage Vcc. The signal $S_{PB}'$ is supplied to the non-inverting input terminal of the differential amplifier 21.

The differential amplifier 21, the diode 22 and the hold capacitor 23 hold the differential signal $S_{PB}'$ and supplies a hold voltage $S_{MH}$ generated in the hold capacitor 23 as denoted by the dotted line in FIG. 3E to the non-inverting input terminal of the comparator 26.

The comparator 26 compares the differential signal $S_{PB}$ and the hold voltage $S_{MH}$ and outputs the on track signal $S_{OT}$. As shown in FIG. 3F, the on track signal $S_{OT}$ attains a logical "L" level if the differential signal $S_{PB}$ has an amplitude larger than the hold voltage $S_{MH}$ and a logical "H" level if the differential signal $S_{PB}$ has an amplitude smaller than the hold voltage $S_{MH}$.

More specifically, while a laser beam emitted from the optical system 3a in the pickup 3 radially moves a recording track on the compact disc 1, the on track signal attains a logical "L" level with the laser beam being irradiated upon the recording track (a groove Gv with pits). The on track signal attains a logical "H" level when the laser beam is irradiated upon a land Ln adjacent to either side of the recording track.

Figure 10:
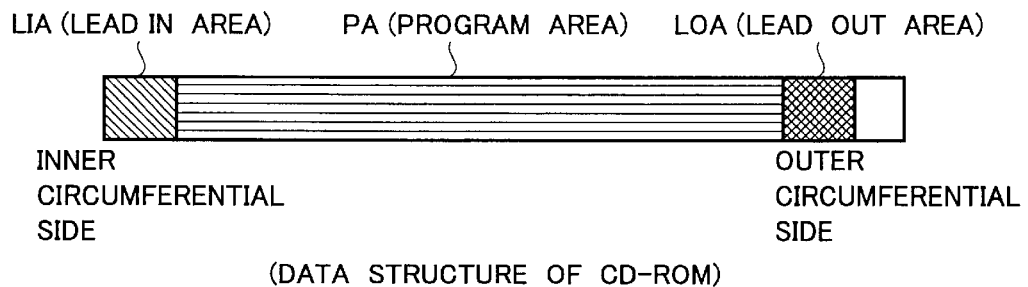
FIG. 10 is a diagram showing the data structure of a CD-ROM.
Figure 11:
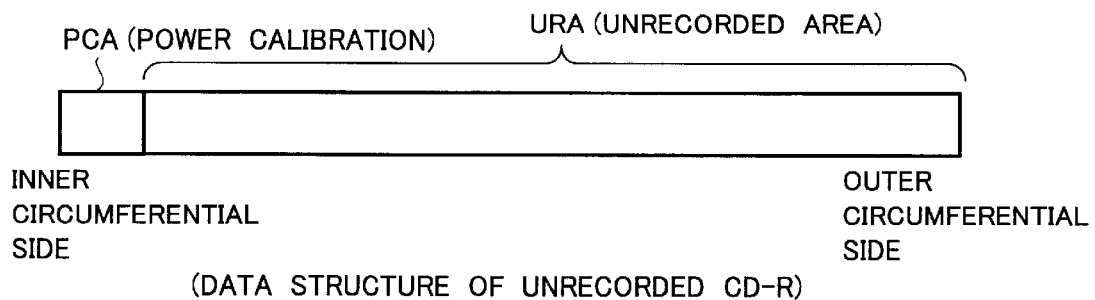
FIG. 11 is a diagram showing the data structure of an unrecorded CD-R.
Figure 12:
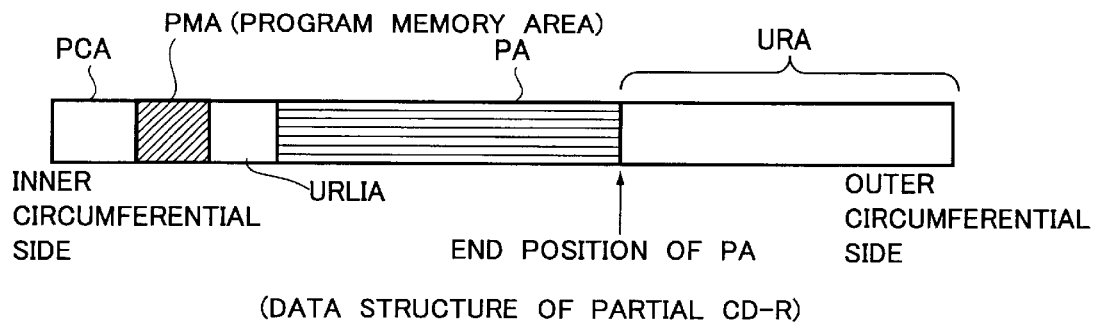
FIG. 12 is a diagram showing the data structure of a partial CD-R.
Figure 13:
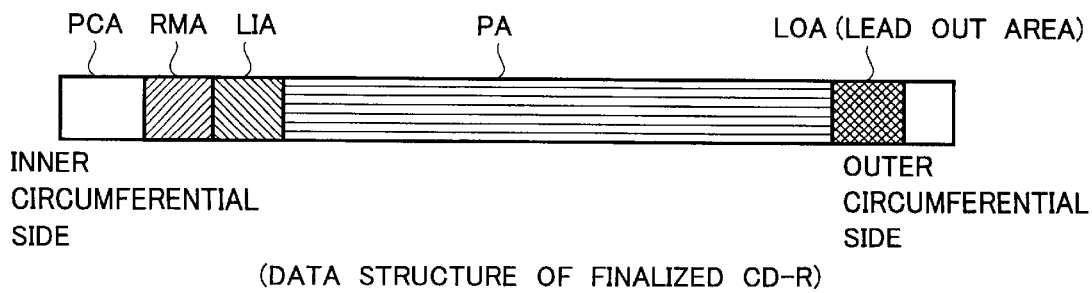
FIG. 13 is a diagram showing the data structure of a finalized CD-R.

Referring back to FIG. 1, the decoder circuit 10 decodes the RF signal $S_{RF}$ supplied from the signal generation circuit 5. More specifically, information included in the RF signal $S_{RF}$ is EFM-demodulated to reproduce information recorded in the lead in area LIA, the program area PA and the lead out area LOA shown in FIG. 10. Then, control data Dc is supplied to the system controller 11. The control data DC has information reproduced from the lead in area LIA and lead out area LOA and sub coding information reproduced from the program area PA among the reproduced information. At the same time, a rotation speed signal Sc representing the rotation speed of the spindle motor 2 is generated from the reproduced sub coding information for supply to the spindle servo circuit 9.

Furthermore, the decoder circuit 10 decodes contents information such as music information among the information reproduced from the program area PA, and generates digital audio data Dout or the like for output as a result. The decoder circuit 10 also supplies the digital audio data Dout to the D/A converter 12 for digital/analog conversion, and an analog audio signal Sout or the like is output.

The system controller 11 includes a microprocessor (MPU) which executes a prescribed system program, and controls the overall operation of the CD player. A control signal $C_{CNT}$ to control the operation of the decoder circuit 10 is generated based on the control data Dc. Meanwhile, control signals $Q_1, Q_2, Q_3$ and $Q_4$ are generated based on the control data. These signals control the on/off state of the focus servo circuit 6, the tracking servo circuit 7, the thread servo circuit 8 and the spindle servo circuit 9, respectively.

The display portion 13 is formed of a liquid crystal display which performs display operation based on display data $D_{DSP}$ supplied from the system controller 11. The operation portion 14 is formed of a control switch, a keyboard or the like for the user to enter a desired instruction to the system controller 11.

Figure 4:
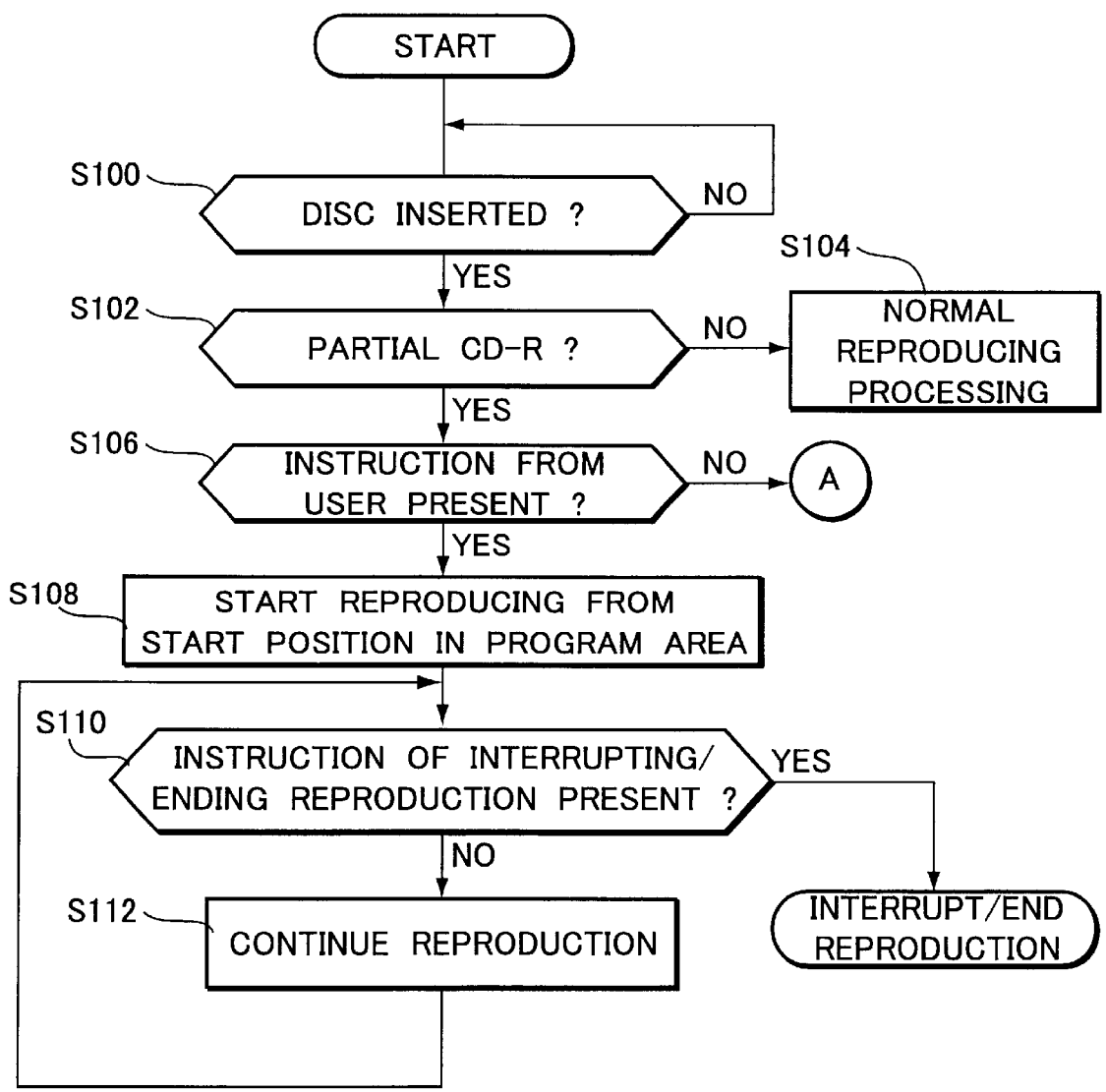
FIGS. 4 to 6 are flowcharts for use in illustration of the operation of an information reproducing apparatus (CD player) according to the embodiment.
Figure 5:
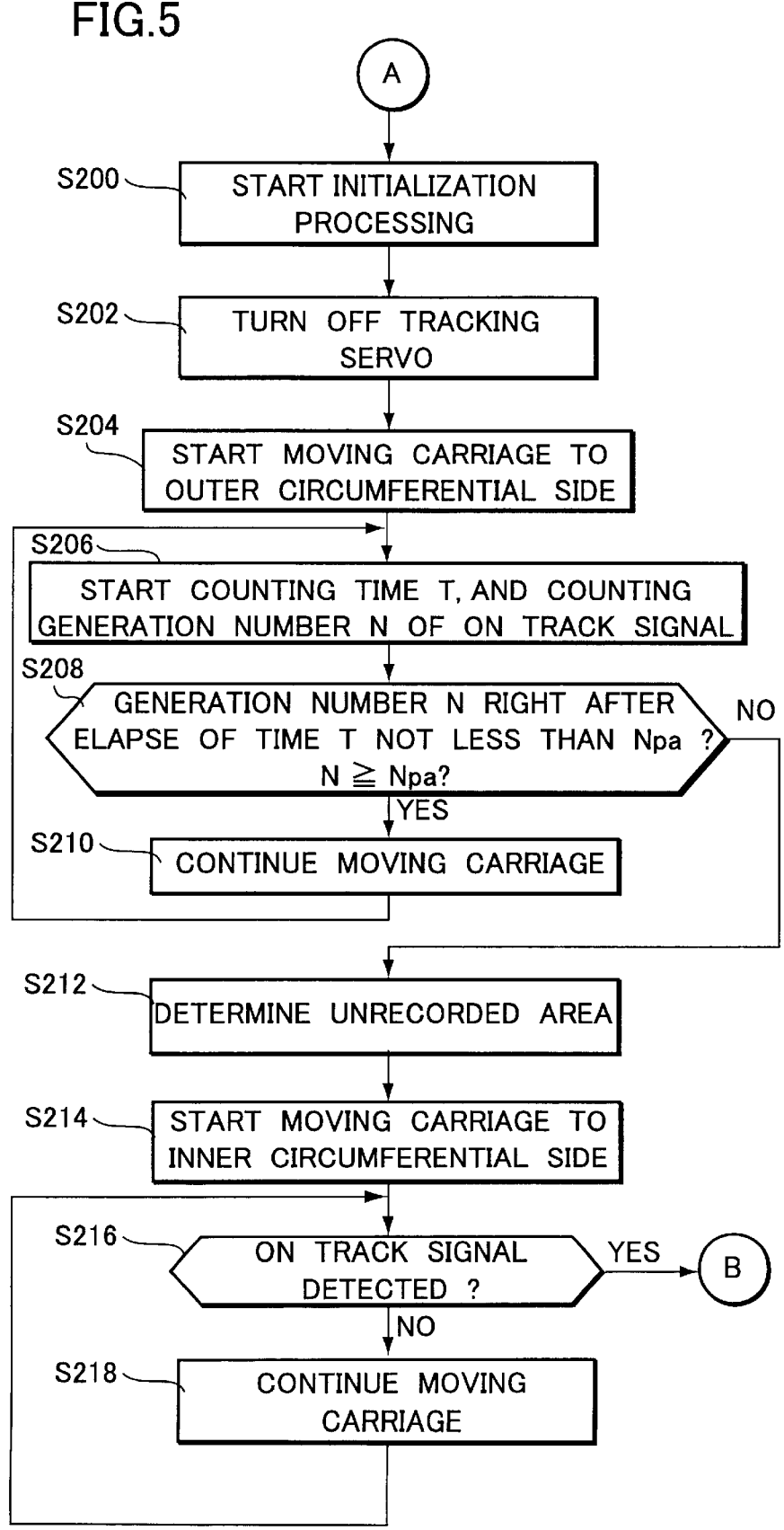
Figure 6:
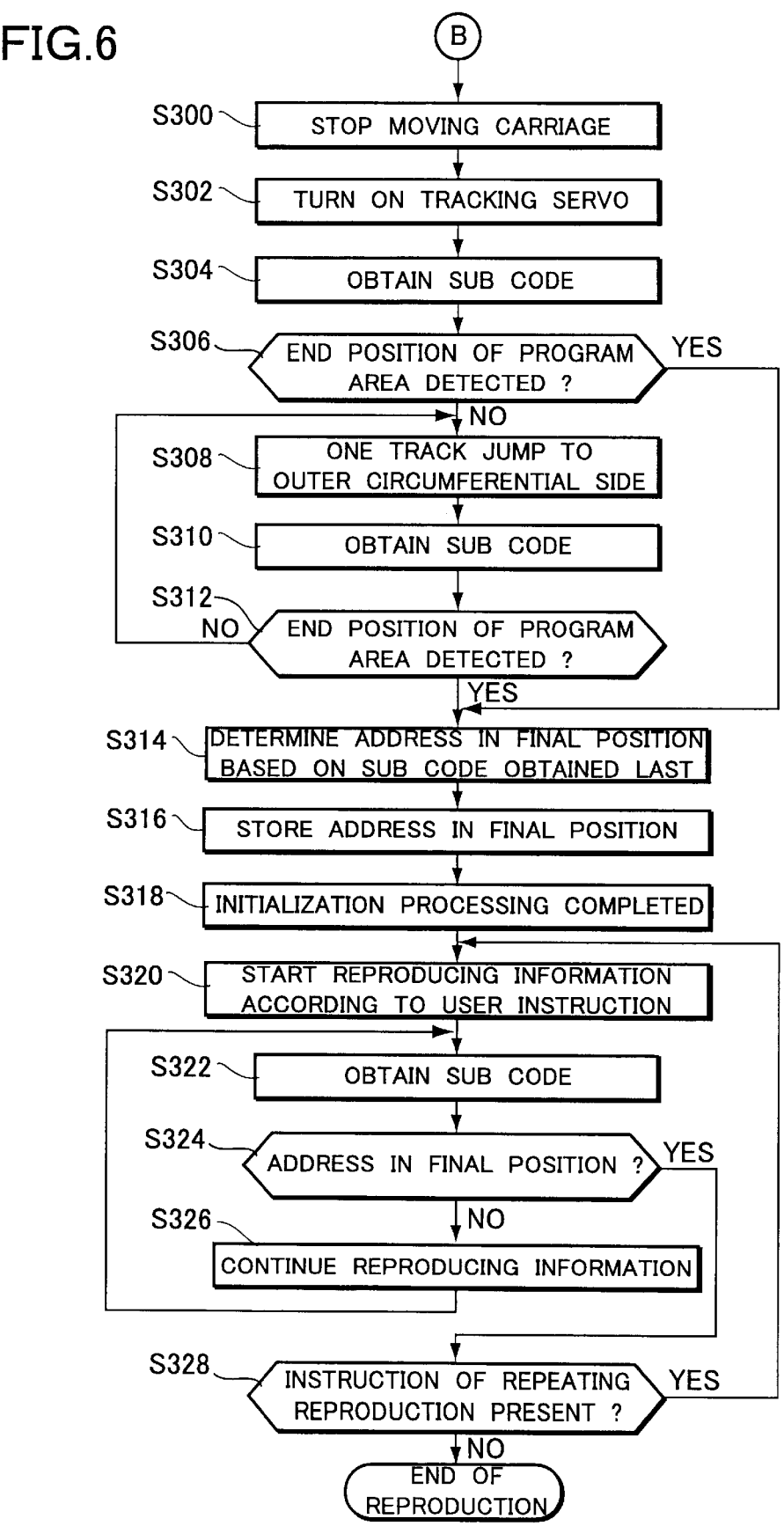

The operation of the CD player having such a structure will be now described in conjunction with the flowcharts in FIGS. 4 to 6.

In FIG. 4, when the power in the CD player is turned on, it is determined in step S100 whether or not a compact disc 1 is inserted. Herein, the compact disc 1 is an information recording medium such as a CD-ROM, a CD-DA, and a CD-R. A photosensor (not shown) provided in the vicinity of the pickup 3 optically senses an end of the compact disc 1, and the system controller 11 performs the determination processing described above based on the detection signal.

When the compact disc 1 is inserted, a reproducing operation is initiated. The kind of the compact disc 1 is determined in step S102. The system controller 11 checks the control data Dc supplied from the decoder circuit 10. If TOC information specified for the CD-ROM is obtained, it is determined that a CD-ROM or a finalized CD-R is inserted. Meanwhile, if the TOC information is not obtained, it is determined that a partial CD-R is inserted.

If a partial CD-R is not inserted, the control proceeds to step S104, and a normal reproducing processing for reproducing information recorded in the CD-ROM or the finalized CD-R is performed.

Meanwhile, if a partial CD-R is inserted, the control proceeds to step S106, and it is determined if any instruction desired by the user has been entered through the operation portion 14. For example, despite the partial CD-R is inserted, if an instruction of prohibiting an initialization processing which will be described such as PLAY designation is given, the control proceeds to step S108. If there is no instruction, the initialization processing as shown in FIG. 5 is automatically initiated as a default processing preset in the system controller 11. The display portion 13 displays that the initialization processing has started and is in progress.

When the control proceeds to step S108, contents information such as music information recorded in the program area PA of the partial CD-R is sequentially reproduced from the start position. Until step S110 in which an instruction of interrupting or ending reproduction is entered through the operation portion 14, the music information or the like recorded in the program area PA continues to be reproduced (step S112). Then, in response to an instruction of interrupting or ending the reproduction, the reproducing operation is interrupted or ends.

Therefore, in steps S106 to S112, the processing the same as the conventional information reproducing apparatus adapted only to the CD-ROM specification is performed. Thus, the CD player still having the processing function the same as the conventional information reproducing apparatus provides unchanged selectivity to cope with the user's need.

When the control proceeds from step S106 to step S200 in FIG. 5, the initialization processing, a function unique to the present invention is started.

In step S202, the system controller 11 controls the tracking servo circuit 7 to stop the operation of the tracking servo control using the control signal $Q_3$. Note however that the focus servo circuit 6 and the spindle servo circuit 9 are allowed to perform their servo control.

Then in step S204, the carriage 4 starts to move radially from the inner circumferential side to the outer circumferential side of the partial CD-R. Thus, as denoted by the arrow X1 in FIG. 7, a laser beam BP emitted from the pickup 3 starts to move over recording tracks (grooves Gv) and lands Ln adjacent to the tracks in the program area PA.

Then in step S206, simultaneously with the initiation of the radial movement of the carriage 4, the system controller 11 activates a program timer stored therein, and starts counting predetermined time T. At the same time, the stored program counter is activated and the number N of generation of the on track signal $S_{OT}$ is counted. More specifically, how many times the on track signal $S_{OT}$ transits from the logical "H" level to the logical "L" level is counted.

In step S208, when the count value of the program timer reaches the time T, the number N of generation counted within the time T and a predetermined threshold value Npa are compared. If N≧Npa, it is determined that the laser beam BP moves over the program area PA, and the control proceeds to step S210 to allow the carriage 4 to continue the movement, and the process from step S206 is repeated.

Figure 7:
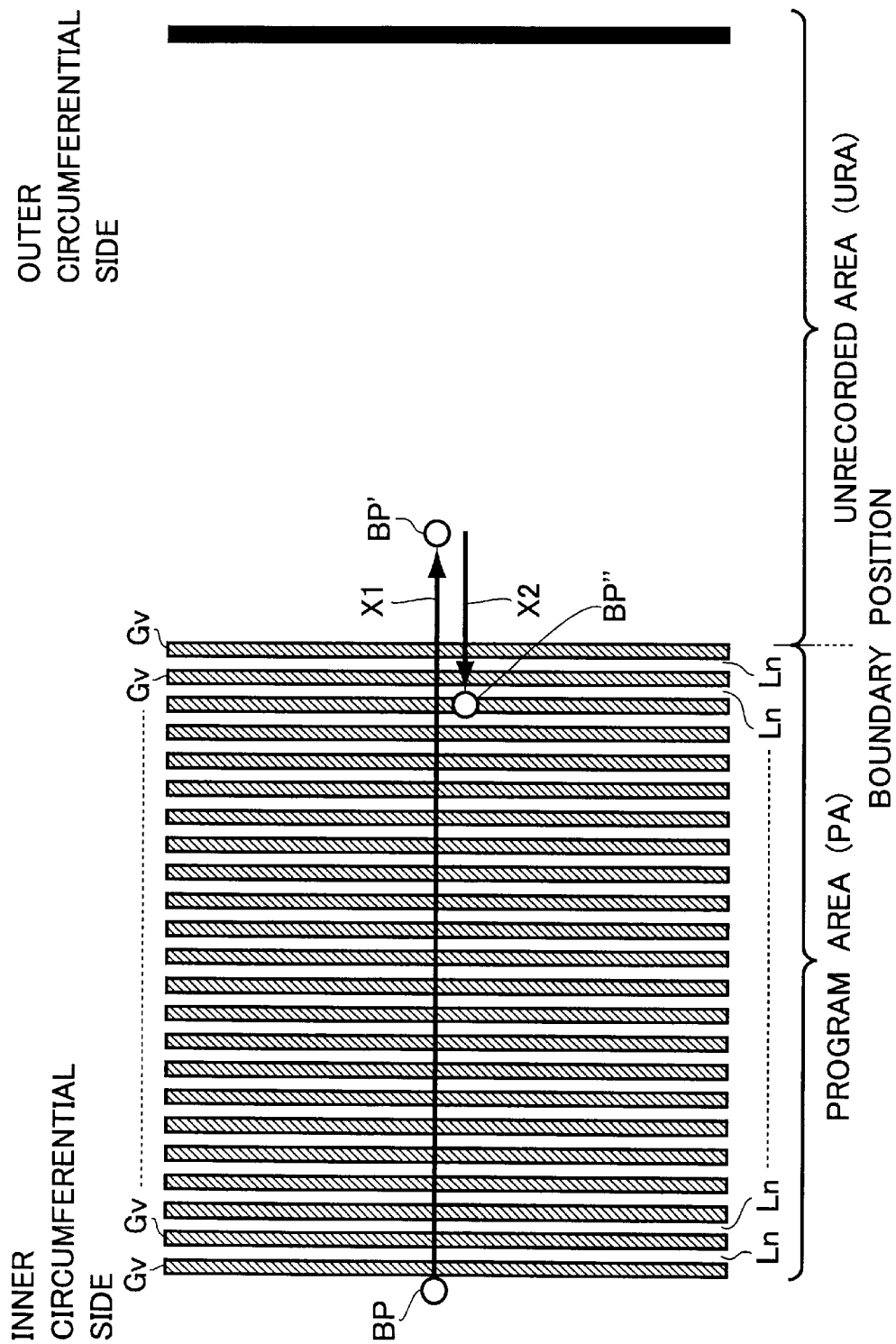
FIG. 7 is a schematic view showing the operation in initialization processing in the information reproducing apparatus (CD player)

Meanwhile, if N<Npa, the control proceeds to step S212, and as denoted by reference BP' in FIG. 7, it is determined that the laser beam is beyond the program area PA and within the range of the unrecorded area URA.

Note that the time T and the threshold value Npa can arbitrarily be set.

Note however that as the time T and the threshold value Npa are set larger, it is more likely that N<Npa is determined only when the laser beam denoted by reference character BP' reaches a position much away from the boundary position between the program area PA and the unrecorded area URA (a position within the range of the unrecorded area URA). Therefore, it takes longer for the determination. Meanwhile, as the time T and the threshold value Npa are set smaller, it is more likely that N<Npa is determined when the laser beam BP' reaches a position close to the boundary position between the program area PA and the unrecorded area URA (a position within the range of the unrecorded area URA). Therefore, it takes shorter for the determination.

However, the compact disc 1 rotates eccentrically because of axial shift or the like, and therefore its position relative to the laser beam could dynamically change. As a result, as the laser beam passes the boundary position between the program area PA and the unrecorded area URA and its vicinity (referred to as the boundary portion), the RF signal SRF and the on track signal SOT sometimes take irregular waveforms as shown in FIGS. 9A and 9B. In general, the compact disc 1 itself has some small deformation, and the thickness sometimes varies at positions. This could also sometimes cause the RF signal $S_{RF}$ and the on track signal $S_{OT}$ to take irregular waveforms as shown in FIGS. 9A and 9B.

The influence is greater as the time T and the threshold value Npa are set to smaller values, which degrades the determination precision. Therefore, according to the embodiment, the time T and the threshold value Npa are set to such values that the waveforms are unaffected.

When it is determined that the laser beam is beyond the program area PA and in the range of the unrecorded area URA, in step S214, the carriage 4, which has moved toward the outer circumference until then, starts to move toward the inner circumference as denoted by the arrow X2 in FIG. 7, in other words the moving direction is reversed. Then, the on track signal $S_{OT}$ continues to be detected.

Then, it is determined in step S216 if the on track signal $S_{OT}$ is detected. More specifically, it is determined if the on track signal $S_{OT}$ in a logical "H" level is detected. If the on track signal $S_{OT}$ is detected, it is then determined that the laser beam has moved within the range of the program area PA as denoted by reference character BP" in FIG. 7. Then, the control proceeds to the processing in step S300 shown in FIG. 6. If the on track signal $S_{OT}$ is not detected, the control proceeds to step S218, and the carriage 4 continues to move toward the inner circumference. Then, again the determination processing in step S216 is repeated.

When the control proceeds to the processing in step S300 shown in FIG. 6, the thread servo circuit 8 is controlled to be turned off in response to the control signal $Q_3$, and the carriage 4 stops moving as a result.

In step S302, the tracking servo circuit 7 is controlled to be turned on in response to the control signal $Q_2$, and thus the tracking servo is started. In step S304, in the tracking servo operation, a recording track in the program area PA is linearly scanned as shown in the schematic view in FIG. 8. Sub coding information is obtained from the resulting control data Dc and stored in a prescribed memory (not shown) in the system controller 11.

Then, in step S306, it is determined based on the control data Dc whether the RF signal $S_{RF}$ is no longer obtained. More specifically, it is determined based on the control data Dc whether there is no information obtained from a recording track with pits.

Figure 8:
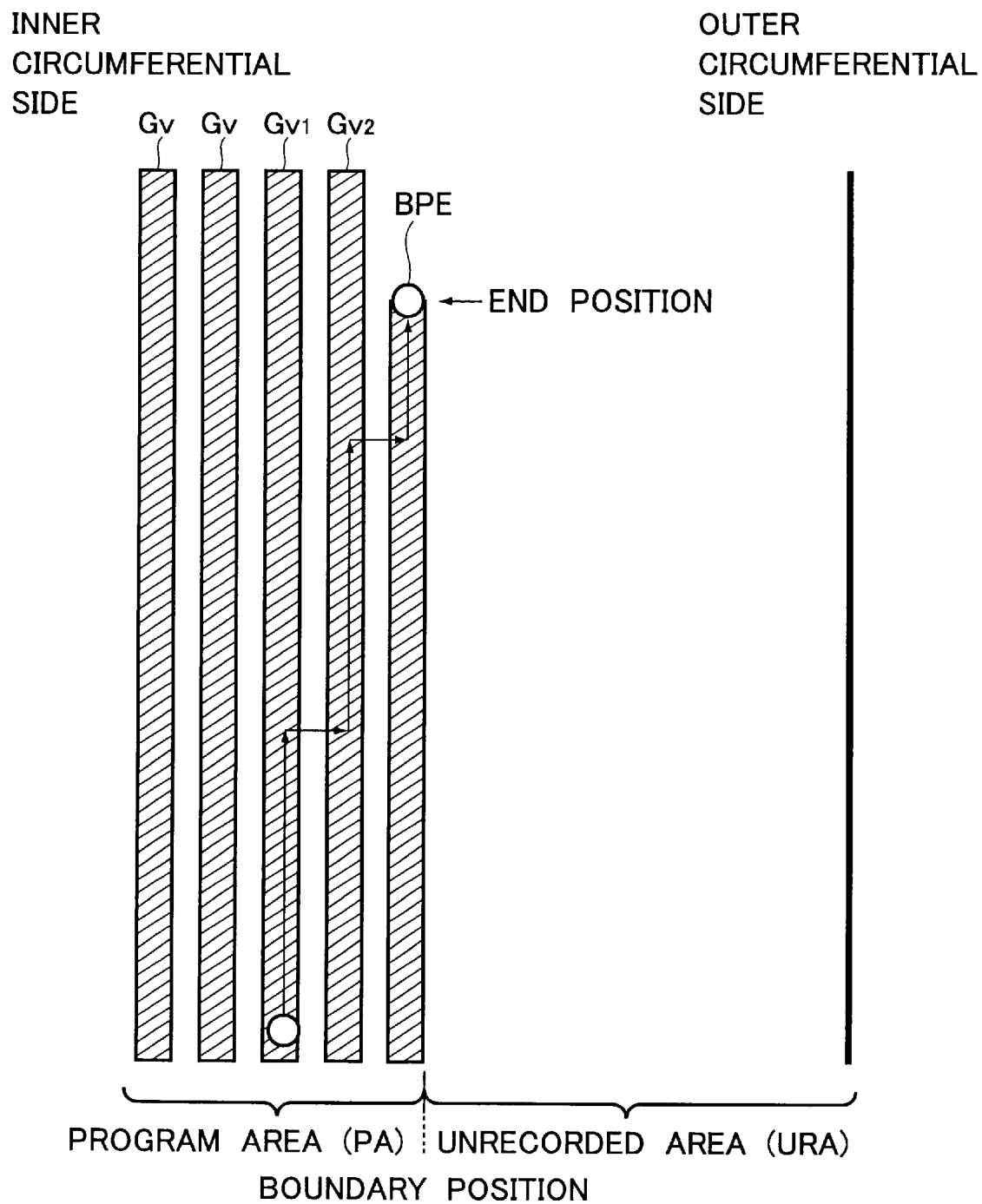
FIG. 8 is a schematic diagram showing the end position of a program area in the information reproducing apparatus (CD player)

If it is determined that information is no longer obtained from the recording track, as shown in FIG. 8, the irradiation position of the laser beam is determined as the physical end position BPE of the program area PA, and the control proceeds to step S314.

Meanwhile, if the physical end position BPE of the program area PA is not detected in step S306, in other words the laser beam continues to be irradiated upon groove Gv1 or Gv2 within the range of the program area PA as shown in FIG. 8, one set of sub coding information (for 98 frames) is read and stored in the memory described above. Then, the control proceeds to the processing in step S308. In step S308, the actuator of the pickup 3 is driven to move the laser beam to the outer circumferential side by one track. Note that this movement to the outer circumferential side by one track is referred to as "one track jump."

Furthermore, in step S310, one set of sub coding information (for 98 frames) is read from the recording track after the one track jump and stored in the memory described above. It is then determined in step S312 whether or not the physical end position BPE of the program area PA is detected, and if the end position BPE has not been detected, the processing from the step S308 is repeated. Once the physical end position BPE of the program area PA is detected, the control proceeds to the processing in step S314.

In step S314, based on the sub coding information obtained and stored last in the memory, the final position of the contents information recorded in the program area PA is obtained. More specifically, a logical address indicating the end position of the contents information is obtained, and the logical address is determined as the end position of the program area PA.

Then in step S316, the logical address is stored in a final position memory (not shown) in the system controller 11, and then in step S318, the initialization processing ends.

Note that after the initialization processing, the display portion 13 is controlled to display the completion of the initialization processing, while indication to ask the user for the next instruction is indicated, and then a stand-by state is attained.

Here, if an instruction to start reproducing information is input, the control proceeds to S320, and contents information recorded in the program area PA starts to be reproduced.

Then in step S322, during the reproduction of the contents information, sub coding information is reproduced. Then in step S324, the system controller 11 obtains information on the present reproduction position based on the reproduced sub coding information. The information on the present reproduction position and the logical address of the final position stored in the final position memory described above are compared. If the present reproduction position information has a value smaller than the value of the logical address of the final position, the control proceeds to step S326, information continues to be reproduced, and the processing from the step S322 is repeated.

More specifically, if the present reproduction position information has a value smaller than the logical address of the final position, it is determined that a laser beam emitted from the pickup 3 is being irradiated upon a recording track in the program area PA, and information continues to be reproduced. If the laser beam is irradiated upon the recording track in the program area PA, the tracking servo effectively functions, and therefore information should correctly be reproduced.

Then in step S324 described above, if the present reproduction position information has a larger value than the logical address of the final position, it is determined that the information has been reproduced up to the end position of the program area PA, and the control proceeds to step S328.

In step S328, if the user has repeatedly issued an instruction of reproduction through the operation portion 14, the reproduction processing from step S320, in other words reproduction of contents information recorded in the program area PA is repeated.

Meanwhile, if there is no instruction, the reproduction processing ends, and a stand-by state is attained. Therefore, the reproduction processing ends before the pickup 3 goes beyond the end position of the program area PA. Since the pickup 3 does not move into the range of the unrecorded area URA, the malfunction of the tracking servo, the problem associated with the conventional device can be prevented.

According to the embodiment, at the time of initialization, the pickup 3 is moved in the radial direction of the compact disc 1, and the end position of the program area PA is detected. Therefore, the end position of the program area PA can be detected faster than the method of line-scanning all the recording tracks. As a result, the user-friendliness can be improved.

Furthermore, since the information recorded in the program area PA is reproduced referring to the detected end position as a limit, and therefore the accessing inability encountered by the conventional techniques can be avoided. Therefore, information can correctly be reproduced from the partial CD-R.

Note that in the above embodiment, the pickup 3 is initially moved from the program area side to the unrecorded area side at the time of initialization. The present invention is however not limited to this, and the pickup 3 may initially be moved from the unrecorded area side to the program area side.

The above embodiment correctly reproduces the partial CD-R, while the present invention may be applied to reproduction of information from disc-shaped information recording media.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information reproducing apparatus having a pickup for detecting physical information on opposing positions in a disc-shaped information recording medium including a recorded area having a recording track recorded with information and an unrecorded area with no information recorded to output a detection signal, said recorded area and said unrecorded area being present in series, and generation means for generating said information recorded in said recorded area based on said detection signal, said apparatus comprising:

control means for moving said pickup in a radial direction of said information recording medium on an outer circumferential side thereof after stopping a tracking servo control;

signal generation means for generating a feature signal including physical feature information on said information recording medium in the radial direction based on said detection signal output from said pickup while said pickup is moving in the radial direction on said outer circumferential side; and determination means for determining which area said pickup detects physical information on, said recorded area or said unrecorded area, based on a change in the feature signal;

wherein said control means determines an end position of said recorded area based on a determination result by said determination means.

2. The information reproducing apparatus according to claim 1, wherein said information recording medium is a partial CD-R.

3. The information reproducing apparatus according to claim 1 or 2, wherein said control means controls said moving means to move said pickup from a side of said recorded area to a side of said unrecorded area, and determines the end position of said recorded area based on said determination result by said determination means during the movement.

4. The information reproducing apparatus according to claim 1 or 2, wherein said control means controls said moving means to move said pickup from a side of said unrecorded area to a side of said recorded area, and determines the end position of said recorded area based on said determination result by said determination means during the movement.

5. The information reproducing apparatus according to claim 1 or 2, wherein said control means controls said moving means to move said pickup from a side of said recorded area to a side of said unrecorded area, and controls said moving means to reversely move said pickup to the side of said recorded area from the side of said unrecorded area after determining that said pickup moves into the range of said unrecorded area based on said determination result by said determination means during the movement, while said control means determines that said pickup moves into the range of said recorded area based on said determination result by said determination means, controls said moving means to further reversely move said pickup on the basis of a prescribed number of recording tracks from the side of said recorded area to the side of said unrecorded area, and determines the end position of said recorded area based on said determination result by said determination means.

6. An information reproducing apparatus having a pickup for detecting physical information on opposing positions in a partial CD-R including a program area having a recording track recorded with information and an unrecorded area with no information recorded to output a detection signal, said program area and said unrecorded area being present in series, and generation means for generating said information recorded in said program area based on said detection signal, said apparatus comprising:

moving means for advancing/withdrawing said pickup in the radial direction of said partial CD-R;

signal generation means for generating a feature signal including physical feature information on said partial CD-R in the radial direction based on said detection signal output from said pickup during said radial movement;

determination means for determining which area said pickup detects physical information on, said program area or said unrecorded area; and control means for controlling each operation of said moving means, said signal generation means and said determination means, said control means controlling said moving means to move said pickup from a side of said program area to a side of said unrecorded area, controlling said moving means to reversely move said pickup from the side of said unrecorded area to the side of said program area after determining that said pickup moves into the range of said unrecorded area, determining that said pickup moves into the range of said program area based on said determination result by said determination means, controlling said moving means to reversely move said pickup on the basis of a prescribed number of recording tracks to the side of said unrecorded area from the side of said program area while obtaining sub coding information included in information generated by said generation means, and determining an end position of said program area based on said determination result by said determination means and said sub coding information.

7. An information reproducing method in an information reproducing apparatus having a pickup for detecting physical information on opposing positions in a disc-shaped information recording medium including a recorded area having a track recorded with information and an unrecorded area in series to output a detection signal, and generation means for generating said information recorded in said recorded area based on said detection signal, said method comprising:

a first step of moving said pickup in a radial direction of said information recording medium on an outer circumferential side thereof after stooping a tracking servo control;

a second step of generating a feature signal including physical feature information on said information recording medium in the radial direction based on said detection signal output from said pickup while said pickup is moving in the radial direction on said outer circumferential side;

a third step of determining which area said pickup detects physical information on, said recorded area or said unrecorded area, based on a change in said feature signal; and a fourth step of determining an end position of said recorded area based on said determination result.

8. The information reproducing method in the information reproducing apparatus according to clam 7, wherein said information recording medium is a partial CD-R.

9. The information reproducing method in the information reproducing apparatus according to claim 7 or 8, wherein said first step allows said pickup to be moved from the side of said recorded area to the side of said unrecorded area.

10. The information reproducing method in the information reproducing apparatus according to claim 7 or 8, wherein said first step allows said pickup to be moved from the side of said unrecorded area to the side of said recorded area.

11. An information reproducing method in an information reproducing apparatus having a pickup for detecting physical information on opposing positions in a disc-shaped information recording medium including a recorded area having a recording track recorded with information and an unrecorded area with no information recorded to output a detection signal, said recorded area and said unrecorded area being present in series and generation means for generating said information recorded in said recorded area based on said detection signal, said method comprising:

a first step of moving said pickup from the side of said recorded area to the side of said unrecorded area, and determining that said pickup moves into the range of said unrecorded area based on physical feature information on said information recording medium in the radial direction obtained during the movement;

a second step of reversely moving said pickup from the side of said unrecorded area to the side of said recorded area after said first step, and determining that said pickup moves into the range of said recorded area based on physical feature information on said information recording medium in the radial direction obtained during the movement; and a third step of reversely moving said pickup on the basis of a prescribed number of recording tracks from the side of said recorded area to the side of said unrecorded area after said second step, and determining an end position of said recorded area based on physical feature information on said information recording medium in the radial direction obtained during the movement.

12. An information reproducing method in an information reproducing apparatus having a pickup for detecting physical information on opposing positions in a partial CD-R including a program area having a track recorded with information and an unrecorded area with no information recorded to output a detection signal, said program area and said unrecorded area being present in series, and generation means for generating said information recorded in said program area based on said detection signal, said method comprising:

a first step of moving said pickup from the side of said program area to the side of said unrecorded area, and determining that said pickup moves into the range of said unrecorded area based on physical feature information on said information recording medium in the radial direction obtained during the movement;

a second step of reversely moving said pickup from the side of said unrecorded area to the side of said program area, and determining that said pickup moves into the range of said program area based on physical feature information on said information recording medium in the radial direction obtained during the movement after the first step; and a third step of reversely moving said pickup from the side of said program area to the side of said unrecorded area on the basis of a prescribed number of recording tracks, while obtaining sub coding information included in information generated by said generation means, and determining an end position of said program area based on said determination result by determination means and said sub coding information.

* * * * *